(12) United States Patent
Wang et al.

(10) Patent No.: US 12,511,594 B2
(45) Date of Patent: Dec. 30, 2025

(54) LIFECYCLE MANAGEMENT IN COLLABORATIVE VERSION CONTROL

(71) Applicant: INTERNATIONAL BUSINESS MACHINES CORPORATION, Armonk, NY (US)

(72) Inventors: Jun Wang, Xian (CN); Bei Chen, Blanchardstown (IE); Yufang Hou, Dublin (IE); Akihiro Kishimoto, Tokyo (JP); Si Er Han, Xian (CN); Jing Xu, Xian (CN); Ji Hui Yang, Beijing (CN); Jing James Xu, Xian (CN); Xue Ying Zhang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 17/462,996

(22) Filed: Aug. 31, 2021

(65) Prior Publication Data

US 2023/0064112 A1 Mar. 2, 2023

(51) Int. Cl.
*G06Q 10/10* (2023.01)
*G06F 40/20* (2020.01)
(Continued)

(52) U.S. Cl.
CPC ..... *G06Q 10/063112* (2013.01); *G06F 40/20* (2020.01); *G06Q 10/063114* (2013.01);
(Continued)

(58) Field of Classification Search
CPC ............ G06F 40/20; G06Q 10/063112; G06Q 10/063114; G06Q 10/063118; G06Q 10/101; G06Q 10/103; G06Q 10/105
See application file for complete search history.

(56) References Cited

U.S. PATENT DOCUMENTS

| 10,089,213 | B1 | 10/2018 | Noble et al. |
| 2007/0250816 | A1* | 10/2007 | Rose ...................... G06Q 10/06 717/124 |

(Continued)

FOREIGN PATENT DOCUMENTS

CN 110674631 1/2020

OTHER PUBLICATIONS

Anonymous, "A Method and System for Automatic Defect Classification and Assignment", IPCOM000220570D, ip.com, Aug. 7, 2012, 8 pages.

(Continued)

*Primary Examiner* — Hanh Thi-Minh Bui
(74) *Attorney, Agent, or Firm* — Robert D. Bean; Andrew D. Wright; Calderon Safran & Wright P.C.

(57) ABSTRACT

A method includes: receiving, by a computing device, an issue definition of an issue with software; generating, by the computing device and based on the issue definition, an urgency score for the issue, the urgency score representing an urgency of resolving the issue; generating, by the computing device and based on the issue definition, a complexity score for the issue, the complexity score representing a complexity of the issue; identifying, by the computing device using natural language processing and based on the urgency score and the complexity score, an assignee to address the issue, the assignee being a team member of a plurality of team members; recommending, by the computing device, to a user the assignee for assignment to address the issue; and tracking, by the computing device, progress of resolving the issue.

20 Claims, 8 Drawing Sheets

(51) Int. Cl.
*G06Q 10/0631* (2023.01)
*G06Q 10/105* (2023.01)
*G06Q 10/101* (2023.01)

(52) U.S. Cl.
CPC ............... *G06Q 10/063118* (2013.01); *G06Q 10/103* (2013.01); *G06Q 10/105* (2013.01); *G06Q 10/101* (2013.01)

(56) References Cited

U.S. PATENT DOCUMENTS

| | | | |
|---|---|---|---|
| 2013/0218619 | A1 | 8/2013 | Fredlander et al. |
| 2014/0358607 | A1 | 12/2014 | Gupta et al. |
| 2017/0083432 | A1* | 3/2017 | Dhulipala ............ G06F 11/3684 |
| 2017/0154307 | A1 | 6/2017 | Maurya et al. |
| 2018/0081683 | A1 | 3/2018 | Shuster et al. |
| 2021/0090000 | A1* | 3/2021 | Avila ............... G06Q 10/06312 |
| 2021/0150381 | A1* | 5/2021 | Alkan .................... G06N 5/041 |
| 2021/0263791 | A1* | 8/2021 | Goodsitt ........ G06Q 10/063118 |
| 2022/0245647 | A1* | 8/2022 | Dhawan ................. G06N 20/00 |
| 2022/0405615 | A1* | 12/2022 | Prokhorenkova ...... G06N 20/20 |

OTHER PUBLICATIONS

Mell et al., "The NIST Definition of Cloud Computing", NIST, Special Publication 800-145, Sep. 2011, 7 pages.

Anonymous, "IBM ILOG CP Optimizer", https://www.ibm.com/analytics/cplex-cp-optimizer, accessed Aug. 24, 2021, 4 pages.

Naveh et al., "Optimatch: Applying Constraint Programming to Workforce Management of Highly-skilled Employees", Conference Paper in International Journal of Services Operations and Informatics, Sep. 2007, 14 pages.

Anonymous, "Work on big ideas, without the busywork", https://asana.com/, accessed Aug. 24, 2021, 18 pages.

Anonymous, "Project Management in GitHub", https://www.zenhub.com/, accessed Aug. 24, 2021, 3 pages.

* cited by examiner

LIFECYCLE MANAGEMENT IN COLLABORATIVE VERSION CONTROL

BACKGROUND

Aspects of the present invention relate generally to software development and, more particularly, to collaborative version control during software development.

Collaborative version control systems are used by software development teams when developing software. These systems assist team managers in building and managing software development teams based on various factors.

SUMMARY

In a first aspect of the invention, there is a computer-implemented method including: receiving, by a computing device, an issue definition of an issue with software; generating, by the computing device and based on the issue definition, an urgency score for the issue, the urgency score representing an urgency of resolving the issue; generating, by the computing device and based on the issue definition, a complexity score for the issue, the complexity score representing a complexity of the issue; identifying, by the computing device using natural language processing and based on the urgency score and the complexity score, an assignee to address the issue, the assignee being a team member of a plurality of team members; recommending, by the computing device, to a user the assignee for assignment to address the issue; and tracking, by the computing device, progress of resolving the issue.

In another aspect of the invention, there is a computer program product including one or more computer readable storage media having program instructions collectively stored on the one or more computer readable storage media. The program instructions are executable to: generate, based on an issue definition of an issue with software, an urgency score for the issue, the urgency score representing an urgency of resolving the issue; generate, based on the issue definition, a complexity score for the issue, the complexity score representing a complexity of the issue; identify, using natural language processing and based on the urgency score and the complexity score, an assignee to address the issue, the assignee being a team member of a plurality of team members; recommend to a user the assignee for assignment to address the issue; and track progress of resolving the issue.

In another aspect of the invention, there is system including a processor, a computer readable memory, one or more computer readable storage media, and program instructions collectively stored on the one or more computer readable storage media. The program instructions are executable to: receive an issue definition of an issue with software; generate, based on the issue definition and using a first gradient boosting decision tree framework model, an urgency score for the issue, the urgency score representing an urgency of resolving the issue; generate, based on the issue definition and using a second gradient boosting decision tree framework model, a complexity score for the issue, the complexity score representing a complexity of the issue; identify, using natural language processing and based on the urgency score and the complexity score, an assignee to address the issue, the assignee being a team member of a plurality of team members; recommend to a user the assignee for assignment to address the issue; and track progress of resolving the issue.

BRIEF DESCRIPTION OF THE DRAWINGS

Aspects of the present invention are described in the detailed description which follows, in reference to the noted plurality of drawings by way of non-limiting examples of exemplary embodiments of the present invention. Like reference numbers refer to the same element in different figures.

DETAILED DESCRIPTION

Figure 1:
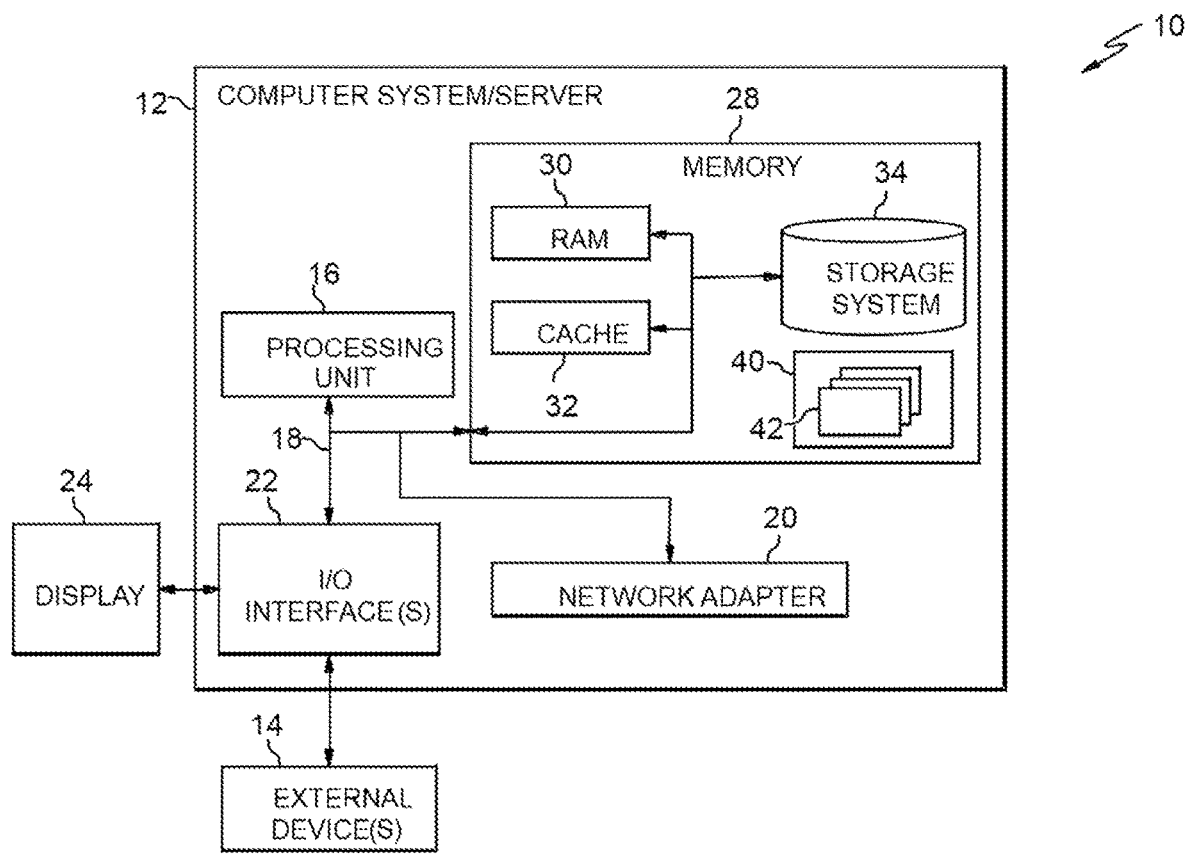
FIG. 1 depicts a cloud computing node according to an embodiment of the present invention.

Aspects of the present invention relate generally to software development and, more particularly, to collaborative version control during software development. According to aspects of the invention a collaborative version control system classifies an issue with the development of a computer program and analyzes the members of a team of programmers to determine a team member to assign to the issue. In embodiments, an issue classifier generates complexity and urgency scores based on a definition of the issue, and a recommender processes the scores along with team information associated with the team members to determine the team member to assign to the issue. In this manner, implementations of the invention provide efficiency and precision to the selection of a programmer to address the issue, tracking of the progress of the issue during its life cycle, and reassigning, if needed, the issue to a different team member.

Embodiments of the invention provide a method that automatically collects, measures, learns from, and utilizes information such as an issue's characteristics and all team members' exact skill sets, real expertise, project experiences, etc., along with a user's preferences and constraints, in a collaborative version control system (CVCS). Such embodiments assist project stakeholders and assist in running projects efficiently and successfully.

Embodiments include: determining issue urgency and complexity scores through building and using an issue classifier; creating and using an intelligent recommender; and operating an issue tracker. In embodiments, the issue classifier includes: a search layer (for example, an artificial intelligence (AI) search algorithm to find the most relevant team member given the role, expertise, authored number of lines of code, etc.); a natural language processing (NLP) layer (for example, an NLP model built on historical bug fixing records and assignees); post-processing (for example, filtering the output from the search layer and NLP layer based on user input constraints and preferences); and a scheduler (which, for example, places the issue in a priority queue of the assignee and, if the queue is not empty, re-shuffles the remaining issues based on an urgency score).

In embodiments, the issue tracker sends reminders to the assignee, the frequency of which is determined by user input or urgency score. The issue tracker also moves solved issues to a test status or a closed status. In embodiments, outputs produced include: a complexity score and an urgency score for the issue; recommended assignees with explanations; recurrent reminders to an assignee for an unclosed issue; and an updated team status. Embodiments include advantages such as, for example: automatic management of the entire lifecycle of an issue in the collaborative version control system; improved efficiency of issue assigning and tracking; reduced human error and bias in issue management; and/or reflection (impact) of user input on current team status.

Embodiments of the invention provide improved software development methods and systems (e.g., an improved CVCS) to address the technical problem of reducing computer down-time resulting from software failures/errors. Implementations of the invention provide new functionality enabling the efficient assignment of one or more computer software coders to an issue (e.g., software error) by generating complexity and urgency scores using machine learning, and recommending an optimal coder using AI and natural language processing. Additionally, embodiments of the invention track the issue to determine whether a more appropriate coder is available to address the issue.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
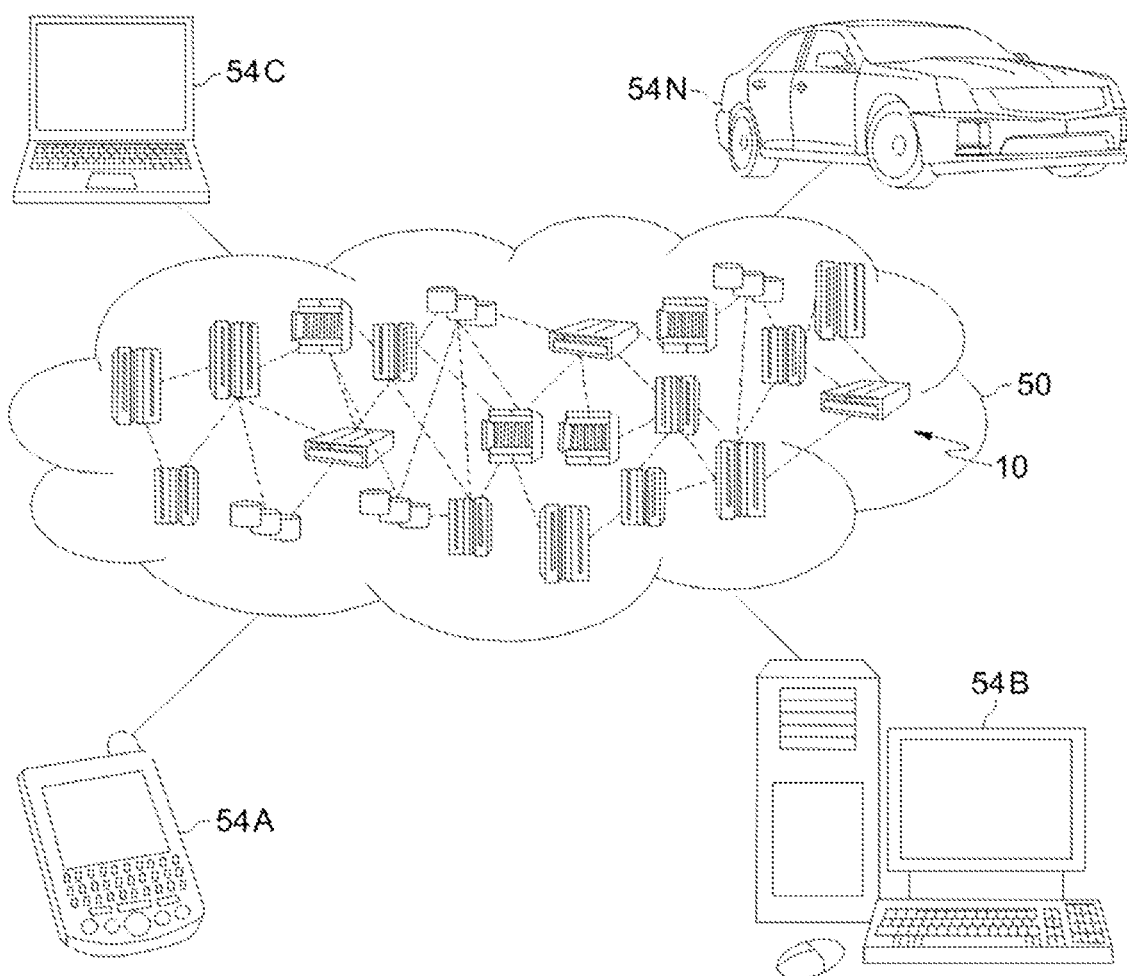
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
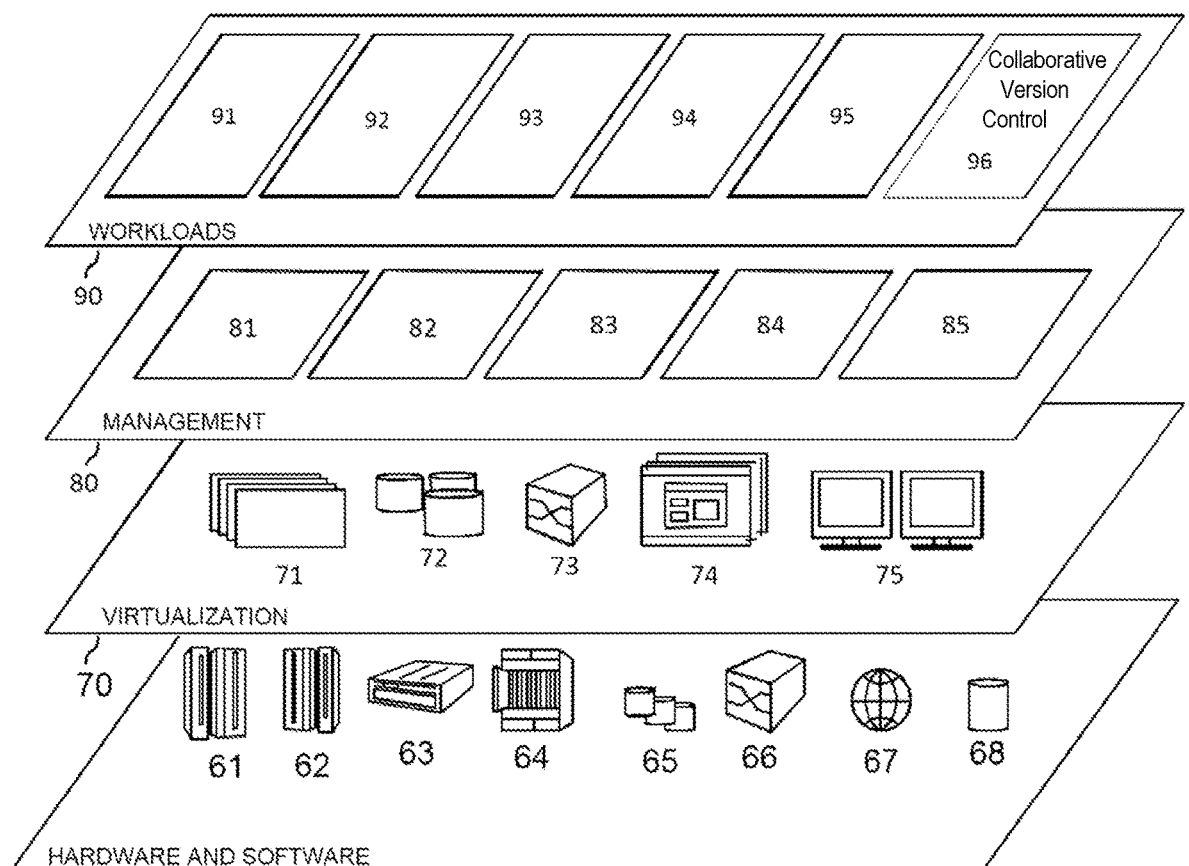
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative version control 96.

Implementations of the invention may include a computer system/server 12 of FIG. 1 in which one or more of the program modules 42 are configured to perform (or cause the computer system/server 12 to perform) one of more functions of the collaborative version control 96 of FIG. 3. For example, the one or more of the program modules 42 may be configured to: receive an issue definition for a particular software issue; generate, based on the issue definition, an urgency score for the issue, the urgency score representing an urgency of resolving the issue; generate, based on the issue definition, a complexity score for the issue, the complexity score representing a complexity of the issue; identify, using natural language processing and based on the urgency score and the complexity score, an assignee to address the issue, the assignee being a team member of a plurality of team members; recommend to a user the assignee for assignment to address the issue; and track progress of resolving the issue.

A CVCS can be used in software team development and development operations environments. Efficient issue assignment and tracking are key challenges for a CVCS. Examples of issues include writing a new piece of code and a bug (flaw) in an existing piece of code. For example, once a software engineer opens an issue, it is advantageous to quickly assign the issue to the most appropriate person ("assignee") to work on that issue. In another example, where an issue is about one problem which involves several sub-problems, it is advantageous to break the problem into smaller and more manageable pieces which can be handled in parallel. Also, because the development team members may change during a particular project, it is advantageous to reflect such changes in the CVCS issues. Efficient management of an issue's lifecycle in CVCS (for example, opening, assigning, tracing and closing) is important for project success but has challenges. For example, a project manager using a CVCS to manage a big research and development project faces the challenge of managing a team that involves many cross-team members having different roles like researchers, developers, testers, writers, etc. When a new issue is opened, it can be very difficult for a manager to assign the new issue to the most relevant assignee quickly because the manager may not know the project schedule and team members' titles and availability. Also, it is often not possible for the manager to know about all team members' exact skill sets, real expertise, project experiences, and other capabilities in a short period of time. The manager may know the urgency of a new issue, but most probably has less information about the complexity of the issue and efforts required to solve the issue. The manager may also be burdened with tracing the issue status. In many cases, it is a challenge for a manager to collect, measure, learn from, and utilize all relevant and important information to efficiently and successfully run a project.

Figure 5:
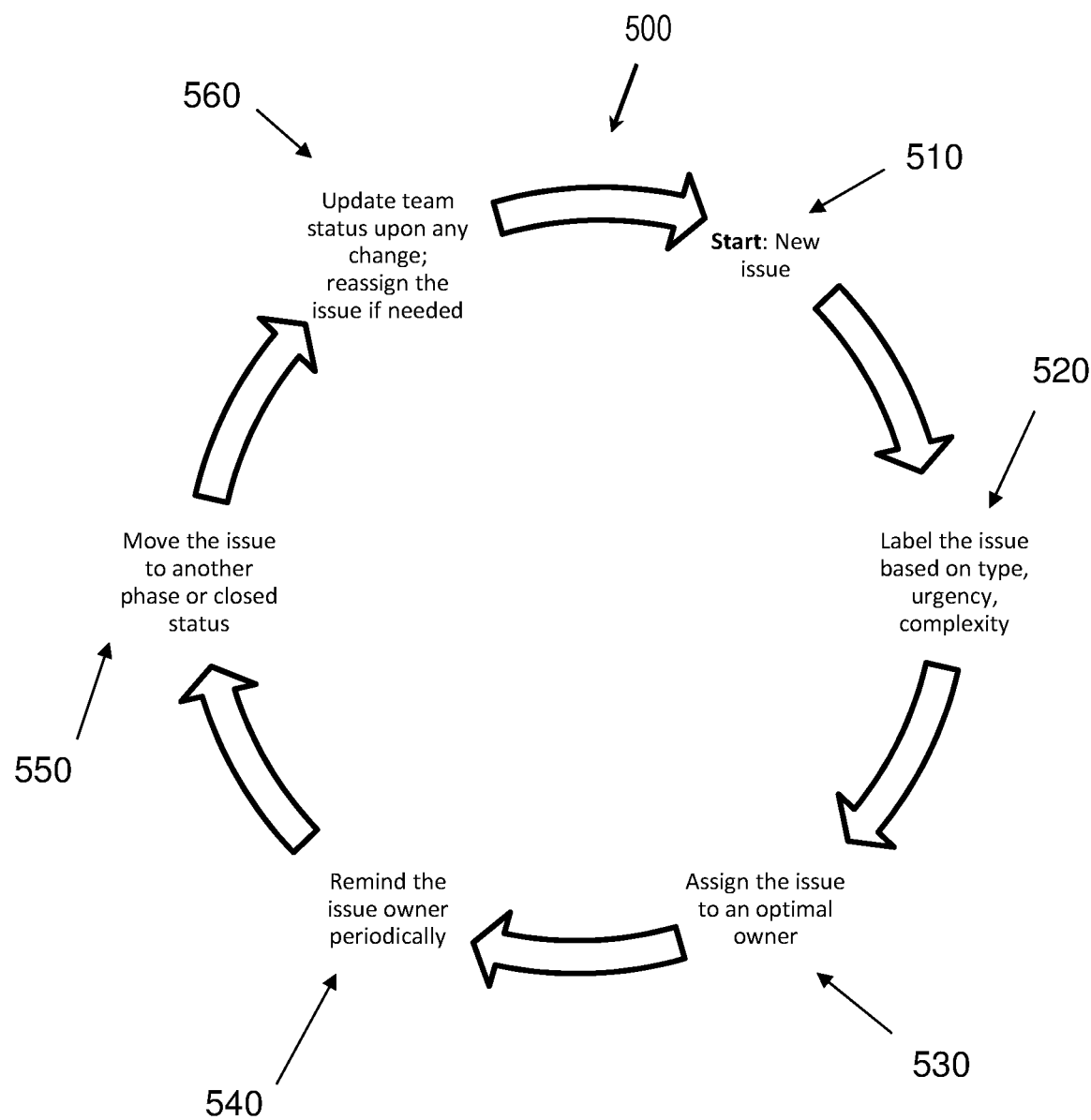
FIG. 5 shows a diagram of an exemplary cycle in accordance with aspects of the invention.

Embodiments of the invention provide end-to-end automatic lifecycle management of a CVCS. An example of management of the lifecycle of an issue in accordance with embodiments of the invention is shown in FIG. 5, discussed in more detail, below.

Figure 4:
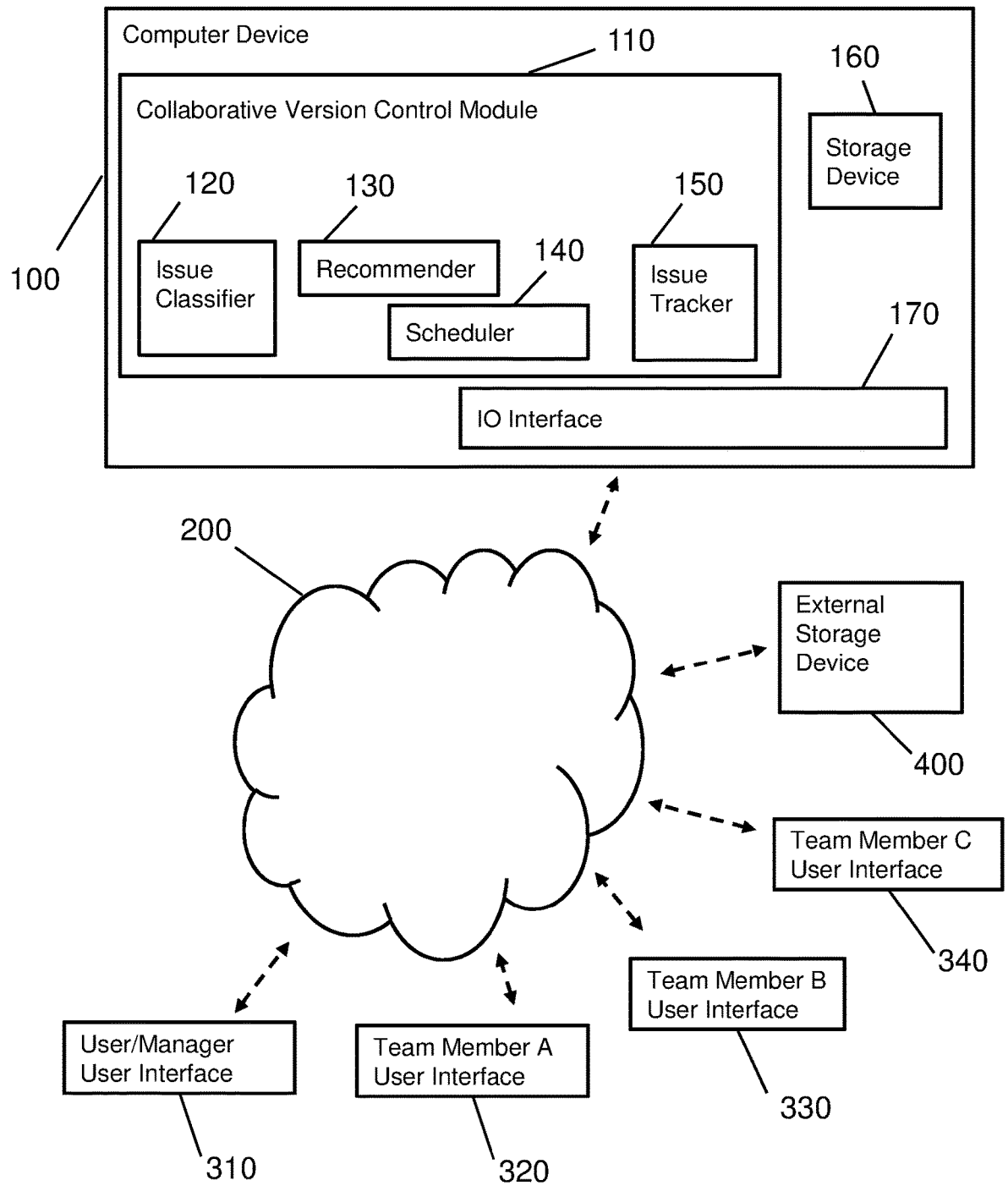
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example, cloud computing environment 50 of FIG. 2. In embodiments, computer device 100 comprises a CVCS. In this example, computer device 100 includes collaborative version control module 110 comprising, for example, one or more of program modules 42 in FIG. 1, and a storage device 160 such as, for example, storage system 34 in FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

FIG. 4 shows collaborative version control module 110 including an issue classifier 120, a recommender 130, a scheduler 140, and an issue tracker 150, which are, for example, one or more of program modules 42 in FIG. 1. In this example, computer device 100 also includes an input/output (IO) interface 170, for example, IO interface 22 in FIG. 1, that provides an interface between computer device 100 and network 200.

Figure 6:
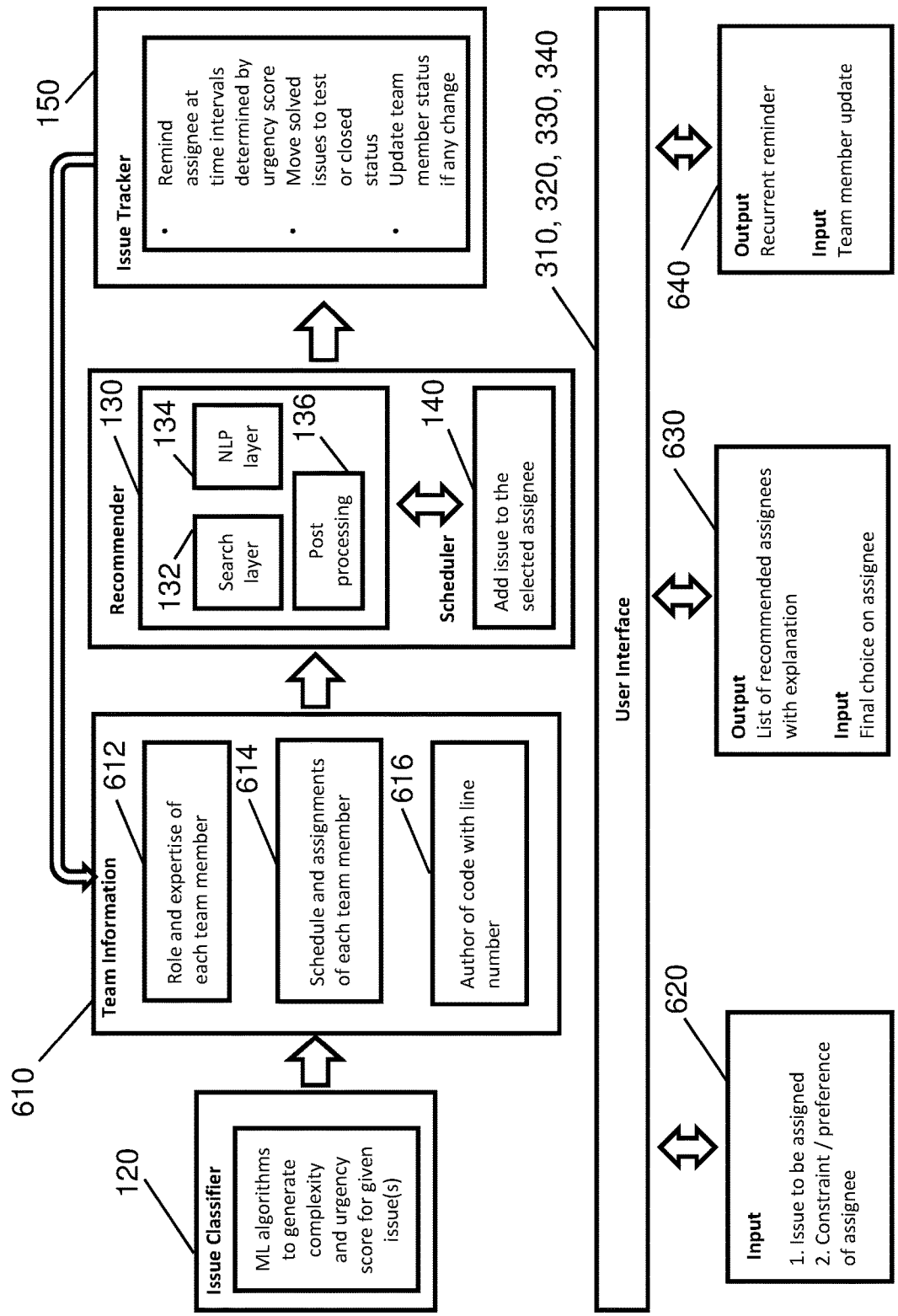
FIG. 6 shows an exemplary flow in accordance with aspects of the invention.

FIG. 4 also shows an external storage device 400 such as, for example, another computer device having some or all of the features of computer system/server 12 in FIG. 1, that is external to computer device 100 and contains data useful to collaborative version control module 110 such as for example, team information 610 shown in FIG. 6. In embodiments, one or more databases, such as for example, databases that include team information 610 shown in FIG. 6, that are accessed by collaborative version control module 110 are stored on storage device 160. In embodiments, databases accessed by collaborative version control module 110 are contained in storage device 160 and/or external storage device 400.

FIG. 4 shows a user/manager user interface 310 that is used by a user to interact with computer device 100. In this disclosure, the term user is understood to mean a user of collaborative version control module 110. An example of a user is a manager who is managing resolution of a software issue. FIG. 4. shows a team member A user interface 320, a team member B user interface 330, and a team member C user interface 340, that represent three members of a software development team. In this example, team member A user interface 320, team member B user interface 330, and team member C user interface 340 access computer device 100 through network 200. In embodiments, one or more team members access computer device 100 directly through a wired connection or by other methods. In embodiments, fewer or more than three team members access computer device 100 and collaborative version control module 110.

FIG. 5 shows an example of a lifecycle 500 of an issue in developing software in accordance with embodiments of the invention. Embodiments of the invention automatically manage the entire lifecycle of an issue in the CVCS. Embodiments include the advantages of: improved efficiency of issue assigning and tracking; reduced human error and bias in issue management; and reflecting user input on a current team status.

In the example shown in FIG. 5, a new issue such as, for example a revision of a routine, starts at 510. In embodiments, at 520, collaborative version control module 110 (of FIG. 4) labels the issue based on type, urgency, and complexity. In embodiments, at 530, collaborative version control module 110 assigns the issue to an optimal assignee (issue owner). In embodiments, at 540, collaborative version control module 110 reminds the assignee periodically (e.g., based on predetermined rules) throughout the assignee's handling of the issue to complete their work on the issue. In embodiments, at 550, collaborative version control module 110 moves the issue to another phase of the life of the issue. For example, at 550, collaborative version control module 110 moves the issue to a testing phase or a closed status. In a case of the issue being moved to a testing phase, collaborative version control module 110 reassigns the issue at 560 to another team member for testing. In a case of the issue being closed, collaborative version control module 110 closes the issue at 550. In embodiments, at 560, collaborative version control module 110 updates the status of team members currently working on, and/or having completed working on, the issue in response to any changes in the team or other changes.

FIG. 6 shows an overview of an exemplary system in accordance with embodiments of the invention. In FIG. 6, issue classifier 120 (of FIG. 4) receives an issue definition of an issue with software. In FIG. 6, issue classifier 120 generates, based on the issue definition, urgency and complexity scores for a given issue, or issues, to be resolved. In embodiments, a machine learning (ML) algorithm takes, for example, as input: the number of lines of code involved in the issue, user input regarding severity and complexity levels of the issue, the number of sub-issues (if any) involved in the issue, and an indication of whether the issue is recurrent or not. Issue classifier 120 outputs an urgency score and a complexity score to the user. In embodiments, issue classifier 120 automatically extracts features including the number of lines of code and the number of sub-issues from a definition of the issue. In embodiments, the issue to be assigned (including the definition of the issue), and any constraints/preferences regarding an assignee are received by issue classifier 120 from the user at 620 and include an issue severity level and a complexity level. In embodiments, the issue severity level is a measure of how big of an impact the issue has on users of the particular software to which the issue pertains. In embodiments, the definition of the issue also includes whether or not the issue is recurring.

In embodiments, the machine learning algorithm of issue classifier 120 produces the urgency score and the complexity score using gradient boosting decision tree framework models which are highly efficient and scalable. In embodiments, the models use the features from the definition of the issue as input. In embodiments, the existence of a user-defined deadline date results in issue classifier 120 setting the urgency score to a highest level and highlighting the deadline in any relevant user interfaces such as, for example, user interfaces 310, 320 and/or 330 (of FIG. 4) during the entire lifecycle of the issue.

With continued reference to FIG. 6, team information 610 includes information used by recommender 130 (of FIG. 4) (along with output from issue classifier 120) to generate a recommended assignee. In embodiments, team information 610 includes at 612 a role (for example, testing or documentation) and expertise (for example, particular languages and/or programs) of each team member. In embodiments, team information 610 includes at 614 a schedule and assignments of each team member. In embodiments, team information 610 at 614 includes a current workload of team members such as, for example, the number of issues on which each team member is currently working. In embodiments, team information 610 includes at 616 authors of code in the software repository including, in some cases, an indication of what author corresponds to each line of code. In embodiments, this author information is used by recommender 130 to determine which team members have experience with particular types of code. In embodiments, team information 610 is collected from a software repository on, for example, storage device 160 and/or external storage device 400. In embodiments, in the case of a team member having commitments in other software repositories and/or projects, the user inputs this information manually into storage device 160 and/or external storage device 400.

In FIG. 6, recommender 130 generates a recommendation of which team member(s) should be assigned to the issue and outputs the recommendation at 630. In embodiments, recommender 130 identifies, using natural language processing and based on the urgency score and the complexity score, an assignee to address the issue, the assignee being a team member of a plurality of team members. In embodiments, the recommendation includes an explanation as to why the particular team member(s) is/are being recommended. In embodiments, the explanation includes the urgency and complexity scores and/or the team information relevant to the recommendation. In the example shown in FIG. 6, recommender 130 includes a search layer 132 and a natural language processing (NLP) layer 134. In embodiments, search layer 132 uses an AI search algorithm to find the most relevant team member based on role, expertise, and number of lines of code authored, in team information 610.

In implementations, NLP layer 134 builds an NLP model based on historical bug fixing records of potential assignees. In embodiments, each layer (search layer 132 and NLP layer 134) independently generates a top selected candidate assignee, and the candidate assignees are fed into a post processing component 136. In implementations, post processing component 136 filters the outputs of search layer 132 and NLP layer 134 based on any constraints or preferences input by the user. In embodiments, the constraints and preferences are limits or ranges placed on the information in team information 610. The two respective candidate assignees generated by search layer 132 and NLP layer 134 can be the same assignee. In embodiments, at 630 the user has an option to select one of the layers (i.e., search layer 132 or NLP layer 134) via user/manager user interface 310 as the layer from which the assignee will be chosen. Otherwise, the user selects at 630 the more suitable assignee from the two candidate assignees. The two-layer design makes recommender 130 more robust against the cases where historical records are sparse.

In embodiments, search layer 132 is modelled as a constraint programming (CP) model where each variable is an issue and each value is a team member. Multiple values may correspond to one issue if that issue needs to be resolved by more than one person. In embodiments, constraints in the model include required skills for each issue, max number of issues allocated to a person, and/or other factors. In embodiments, a constraint optimizer finds a solution to the CP model that results in the issue assignment to one or more team members. In embodiments, if issues need to be reassigned (e.g., one member has left a project), the constraint optimizer is called again, starting with a value ordering which prioritizes the previous issue assignment. This allows for a new issue assignment which has a smaller number of changes to the previous assignment.

In FIG. 6, a scheduler 140 (of FIG. 4) places the issue in a priority queue of the assignee chosen to address the issue. If the priority queue of the assignee is not empty, scheduler 140 re-shuffles the remaining issues in the queue based on the urgency (for example, the urgency scores) of the issues in the queue.

In FIG. 6, an issue tracker 150 (of FIG. 4) tracks the issue through its life cycle. In embodiments, issue tracker 150 sends reminders at 640 to the assignee, the frequency of which is determined by user input or urgency score. In embodiments, issue tracker 150 moves solved issues to either a test phase or to a closed status. Once the user (or a team member) inputs at 640 any change of team member(s), for example a team member leaving the project, issue tracker 150 updates team information 610 and sends the issue back to recommender 130 for re-assessment to a different team member.

Figure 7:
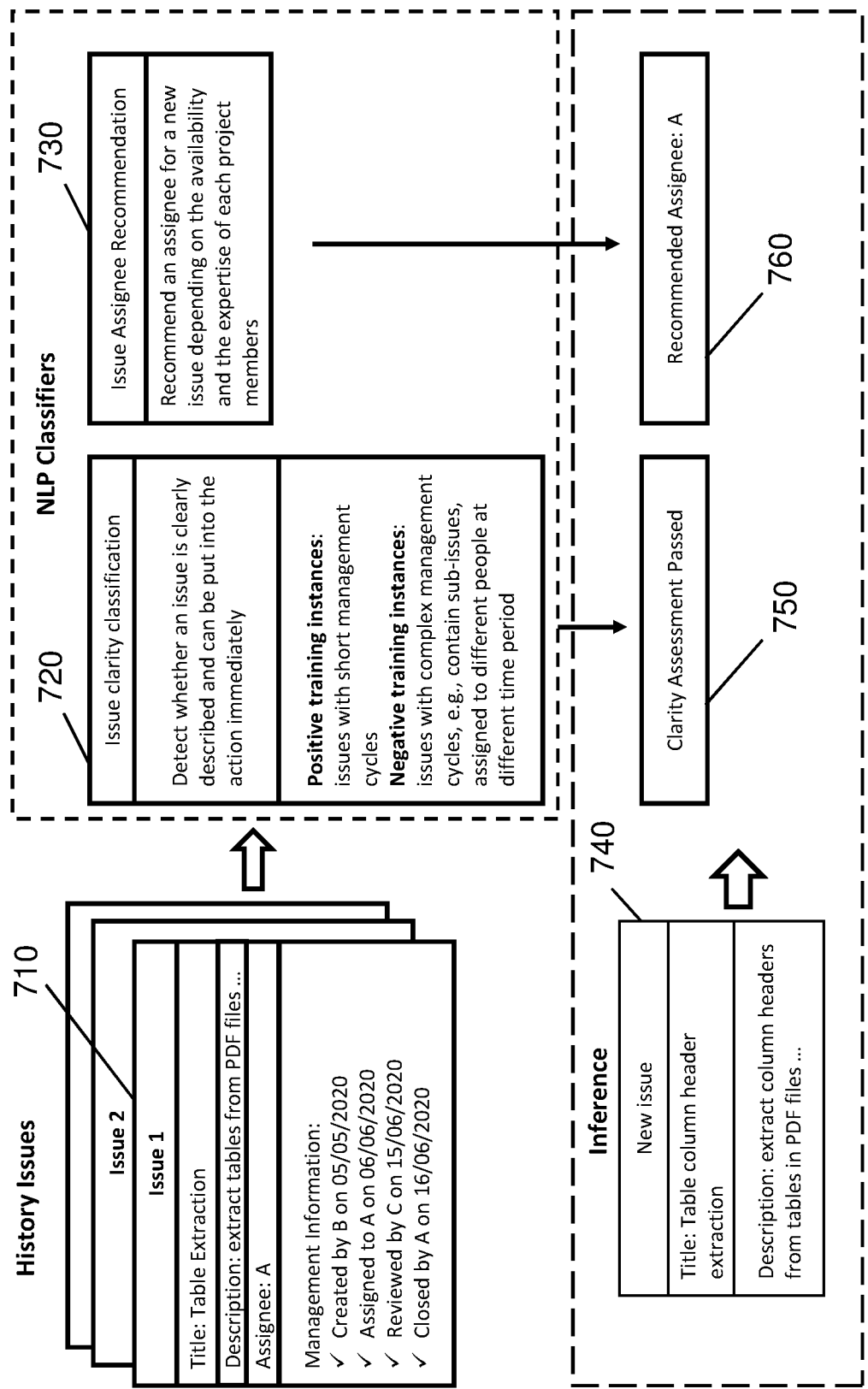
FIG. 7 shows an exemplary natural language processing layer in accordance with aspects of the invention.

FIG. 7 shows an example of an NLP layer in accordance with embodiments of the invention. The NLP layer of FIG. 7 can be used at the NLP layer 134 of FIG. 6. FIG. 7 shows a history of issues including Issue 1 represented at 710. In this example, the history of Issue 1 includes: the title of the issue "Table Extraction"; a description of the issue; the identification of the assignee "A" (i.e., team member A); and various management information.

FIG. 7 shows two NLP classifiers (processes), issue clarity classification 720 and issue assignee recommendation 730. Issue clarity classification 720 detects whether or not an issue is clearly described and can be put into the action immediately. In embodiments, issue clarity classification 720 determines whether the issue is a positive training instance or a negative training instance. A positive training instance may be an issue with a short management cycle in that it is a previously solved type of issue which is clearly described to focus on one point and has clear management cycles with status updates (such as, for example, assign, estimation, resolve, test, and close) which are sufficiently clear for collaborative version control module 110 to assign and track. A negative training instance may be an issue with complex management cycles in that it contains sub-issues that are assigned to different people and/or at different time periods. With a negative training instance, recommender 130 uses NLP to extract information (project related, feature related, management related, release version, date, and/or other information). In some cases, pre-defined rules and/or manual operation are needed to label each training instance as either positive or negative. In embodiments, if an issue cannot be labeled as a positive training instance, issue clarity classification 720 labels the issue as negative due to its complex management cycles, or ambiguous description.

In embodiments, if issue clarity classification 720 classifies the issue as positive, issue classifier 120 labels the issue as Clarity Assessment Passed at 750, and then recommender 130 conducts issue assignment recommendation 730. In embodiments, if issue clarity classification 720 classifies the issue as negative, issue classifier 120 breaks the issue into sub-issues and each of the sub-issues is managed and tracked separately. In embodiments, if it is unclear from the issue description how to classify the issue, issue classifier 120 (or some other element of collaborative version control module 110) requests clarification from the user in the form of, for example, project/feature/management related information for resubmission to issue classifier 120.

In embodiments, at issue assignee recommendation 730, recommender 130 recommends an assignee for a new issue 740 depending on the availability and the expertise of each project member. In embodiments, recommender 130 trains a multi-label classifier using history issues (such as, for example, Issue 1, Issue 2, etc.) and then recommender 130 chooses the most available assignee as a recommended assignee at 760 (for example, team member A) from a list of appropriate assignees.

Figure 8:
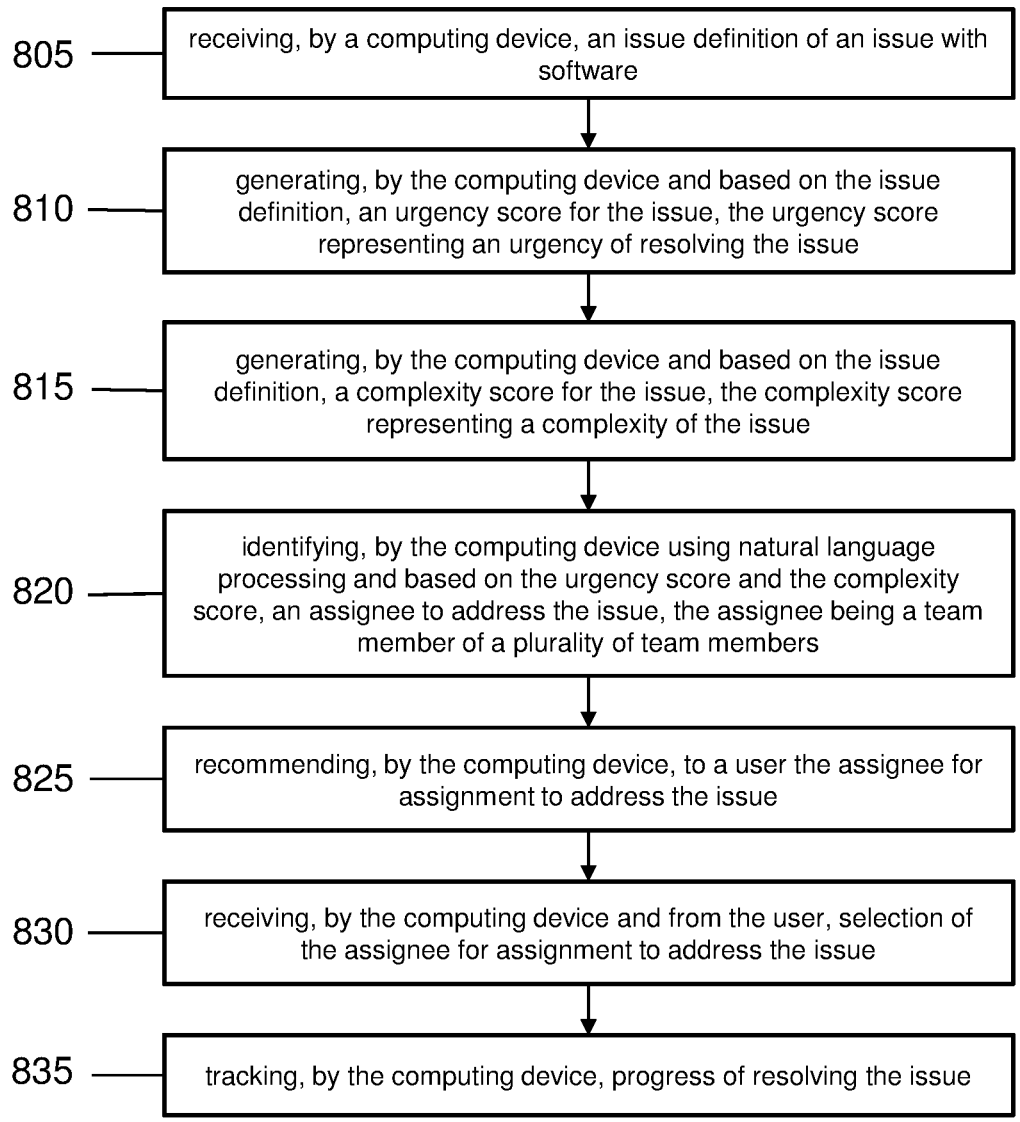
FIG. 8 shows a flowchart of an exemplary method in accordance with aspects of the invention.

FIG. 8 shows a flowchart of an exemplary method in accordance with aspects of the present invention. Steps of the method may be carried out in the environment of FIG. 4 and are described with reference to elements depicted in FIG. 4.

At step 805, the system receives, by a computing device, an issue definition of an issue with software. In embodiments, and as described with respect to FIGS. 4, 6 and 7, issue classifier 120 of computer device 100 receives from a user an issue definition of an issue with software at step 805.

At step 810, the system generates, based on the issue definition, an urgency score for the issue, the urgency score representing an urgency of resolving the issue. In embodiments, and as described with respect to FIGS. 4, 6 and 7, issue classifier 120 of computer device 100 generates, based on the issue definition, an urgency score for the issue, the urgency score representing an urgency of resolving the issue at step 810.

At step 815, the system generates, based on the issue definition, a complexity score for the issue, the complexity score representing a complexity of the issue. In embodiments, and as described with respect to FIGS. 4, 6 and 7, issue classifier 120 of computer device 100 generates, based on the issue definition, a complexity score for the issue, the complexity score representing a complexity of the issue at step 815.

At step 820, the system identifies, using natural language processing and based on the urgency score and the complexity score, an assignee to address the issue, the assignee being a team member of a plurality of team members. In embodiments, and as described with respect to FIGS. 4, 6 and 7, recommender 130 of computer device 100 identifies, using natural language processing and based on the urgency score and the complexity score, an assignee to address the issue, the assignee being a team member of a plurality of team members at step 820.

At step 825, the system recommends to a user the assignee for assignment to address the issue. In embodiments, and as described with respect to FIGS. 4, 6 and 7, recommender 130 recommends to a user (e.g., by sending a recommendation to the user via the user/manager user interface 310) the assignee for assignment to address the issue at step 825.

At step 830, the system receives, from the user, selection of the assignee for assignment to address the issue. In embodiments, and as described with respect to FIGS. 4, 6 and 7, recommender 130 of computer device 100 receives, from the user via a user interface (e.g., user/manager user interface 310), a selection of the assignee for assignment to address the issue at step 830.

At step 835, the system tracks progress of resolving the issue. In embodiments, and as described with respect to FIGS. 4, 6 and 7, issue tracker 150 of computer device 100 tracks progress of resolving the issue at step 835.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing device, an issue definition of an issue with software;
   generating, by the computing device and based on the issue definition, an urgency score for the issue by utilizing a machine learning algorithm on a gradient boosting decision tree framework model, the urgency score representing an urgency of resolving the issue;
   generating, by the computing device and based on the issue definition, a complexity score for the issue by utilizing the machine learning algorithm on the gradient boosting decision tree framework model, the complexity score representing a complexity of the issue;
   identifying, by the computing device using natural language processing and based on the urgency score and the complexity score, an assignee to address the issue, the assignee being a team member of a plurality of team members;
   recommending, by the computing device, to a user the assignee for assignment to address the issue; and
   tracking, by the computing device, progress of resolving the issue,
   wherein the gradient boosting decision tree framework model receives a number of lines of code in the issue definition of the issue, a number of sub-issues involved in the issue definition of the issue, and whether the issue is recurrent.

2. The method of claim 1, further comprising receiving, by the computing device and from the user, selection of the assignee for assignment to address the issue.

3. The method of claim 1, wherein the identifying the assignee is based on a role and an expertise of the assignee, wherein the identifying the assignee to address the issue comprises utilizing an artificial intelligence (AI) algorithm to identify the assignee based on a role, expertise, and the number of lines of code authored.

4. The method of claim 1, further comprising placing the issue in a priority queue for the assignee to address the issue, wherein the identifying the assignee comprises a search layer identifying a first relevant team member of the team members.

5. The method of claim 4, wherein the identifying the first relevant team member is based on the search layer identifying a role and an expertise of each of the team members.

6. The method of claim 5, wherein the identifying the assignee comprises a natural language processing layer building a natural language processing model based on historical bug fixing records of the team members and identifies, using the model, a second relevant team member of the team members.

7. The method of claim 6, wherein the identifying the assignee comprises selecting, by the computing device, either the first relevant team member or the second relevant team member as the assignee.

8. The method of claim 7, wherein the selecting is based on constraints input by the user.

9. The method of claim 1, wherein the identifying the assignee comprises a natural language processing layer building a natural language processing model based on historical bug fixing records of the team members and identifies, using the model, a second relevant team member of the team members.

10. The method of claim 9, wherein the natural language processing layer detects whether the issue is a previously solved type of the issue which is described to focus on one point.

11. The method of claim 10, wherein as a result of the natural language processing layer detecting that the issue is the previously solved type of the issue which is described to focus on the one point, the natural language processing layer proceeds to the identifying the assignee.

12. The method of claim 10, wherein as a result of the natural language processing layer detecting that the issue is not the previously solved type of the issue which is described to focus on the one point, the natural language processing layer divides the issue into sub-issues and detects whether each sub-issue is the previously solved type of the issue which is clearly described to focus on the one point.

13. The method of claim 1, wherein the recommending includes an explanation as to why the assignee is being recommended.

14. A computer program product comprising one or more computer readable storage media having program instructions collectively stored on the one or more computer readable storage media, the program instructions executable to:
 generate, based on an issue definition of an issue with software, an urgency score for the issue by utilizing a machine learning algorithm on a gradient boosting decision tree framework model, the urgency score representing an urgency of resolving the issue;
 generate, based on the issue definition, a complexity score for the issue by utilizing the machine learning algorithm on the gradient boosting decision tree framework model, the complexity score representing a complexity of the issue;
 identify, using natural language processing and based on the urgency score and the complexity score, an assignee to address the issue, the assignee being a team member of a plurality of team members;
 recommend to a user the assignee for assignment to address the issue; and
 track progress of resolving the issue,
 wherein the gradient boosting decision tree framework model receives a number of lines of code in the issue definition of the issue, a number of sub-issues involved in the issue definition of the issue, and whether the issue is recurrent.

15. The computer program product of claim 14, wherein the identifying the assignee comprises a natural language processing layer building a natural language processing model based on historical bug fixing records of the team members and identifies, using the model, a relevant team member of the team members.

16. The computer program product of claim 15, wherein the natural language processing layer detects whether the issue is a previously solved type of the issue which is described to focus on one point, and the identifying the assignee to address the issue comprises utilizing an artificial intelligence (AI) algorithm to identify the assignee based on a role, expertise, and the number of lines of code authored.

17. The computer program product of claim 16, wherein as a result of the natural language processing layer detecting that the issue is the previously solved type of the issue which is described to focus on the one point, the natural language processing layer proceeds to the identifying the assignee.

18. The computer program product of claim 16, wherein as a result of the natural language processing layer detecting that the issue is not the previously solved type of the issue which is described to focus on the one point, the natural language processing layer divides the issue into sub-issues and detects whether each sub-issue is the previously solved type of issue which is clearly described to focus on the one point.

19. The computer program product of claim 14, further comprising placing the issue in a priority queue for the assignee to address the issue, wherein as a result of the assignee no longer being the team member, identifying, using the natural language processing and based on the urgency score and the complexity score, a new assignee to address the issue, the new assignee being one of the team members.

20. A system comprising:
 a processor, a computer readable memory, one or more computer readable storage media, and program instructions collectively stored on the one or more computer readable storage media, the program instructions executable to:
 receive an issue definition of an issue with software;
 generate, based on the issue definition and using a machine learning algorithm on a first gradient boosting decision tree framework model, an urgency score for the issue, the urgency score representing an urgency of resolving the issue;
 generate, based on the issue definition and using the machine learning algorithm on a second gradient boosting decision tree framework model, a complexity score for the issue, the complexity score representing a complexity of the issue;
 identify, using natural language processing and based on the urgency score and the complexity score, an assignee to address the issue, the assignee being a team member of a plurality of team members;
 recommend to a user the assignee for assignment to address the issue; and
 track progress of resolving the issue,
 wherein the first gradient boosting decision tree framework model and the second gradient boosting decision tree framework model receive a number of lines of code in the issue definition of the issue, a number of sub-issues involved in the issue definition of the issue, and whether the issue is recurrent.

* * * * *